US011949104B2

(12) United States Patent
Yamamoto

(10) Patent No.: US 11,949,104 B2
(45) Date of Patent: Apr. 2, 2024

(54) SLURRY FOR FORMING ELECTRODE-ACTIVE-MATERIAL LAYER FOR CELL

(71) Applicant: DAICEL CORPORATION, Osaka (JP)

(72) Inventor: Akito Yamamoto, Tokyo (JP)

(73) Assignee: DAICEL CORPORATION, Osaka (JP)

( * ) Notice: Subject to any disclaimer, the term of this patent is extended or adjusted under 35 U.S.C. 154(b) by 79 days.

(21) Appl. No.: 16/976,373

(22) PCT Filed: Jul. 18, 2019

(86) PCT No.: PCT/JP2019/028364
§ 371 (c)(1),
(2) Date: Aug. 27, 2020

(87) PCT Pub. No.: WO2020/017614
PCT Pub. Date: Jan. 23, 2020

(65) Prior Publication Data
US 2021/0376326 A1 Dec. 2, 2021

(30) Foreign Application Priority Data
Jul. 20, 2018 (JP) .................................. 2018-137148

(51) Int. Cl.
*H01M 4/62* (2006.01)
*H01M 4/04* (2006.01)
*H01M 4/36* (2006.01)
*H01M 4/64* (2006.01)

(52) U.S. Cl.
CPC ............. *H01M 4/621* (2013.01); *H01M 4/04* (2013.01); *H01M 4/366* (2013.01); *H01M 4/64* (2013.01)

(58) Field of Classification Search
CPC ........ H01M 4/621; H01M 4/04; H01M 4/366; H01M 4/64; H01M 4/622; H01M 4/13; H01M 4/133; H01M 10/0525; Y02T 10/70; H01G 11/28; H01G 11/38; Y02E 60/10
See application file for complete search history.

(56) References Cited

U.S. PATENT DOCUMENTS

| 2009/0042100 A1 | 2/2009 | Tanaka et al. | |
|---|---|---|---|
| 2016/0005551 A1* | 1/2016 | Ishii | H01G 11/38 156/60 |
| 2016/0126554 A1* | 5/2016 | Beneventi | H01M 10/0525 29/623.5 |
| 2016/0260973 A1 | 9/2016 | Sonobe et al. | |
| 2017/0200943 A1* | 7/2017 | Kawakami | H01G 11/40 |

FOREIGN PATENT DOCUMENTS

| JP | 2009-43641 A | | 2/2009 |
|---|---|---|---|
| JP | 2016-91902 A | | 5/2016 |
| JP | 2016091902 A | * | 5/2016 |
| JP | 2017-130451 A | | 7/2017 |
| JP | 2017130451 A | * | 7/2017 |
| JP | 2018-116819 A | | 7/2018 |

OTHER PUBLICATIONS

International Search Report and Written Opinion of the International Searching Authority, dated Oct. 15, 2019, for International Application No. PCT/JP2019/028364, with an English translation of the International Search Report.
English translation of the International Preliminary Report on Patentability and Written Opinion of the International Searching Authority (Forms PCT/IB/373 and PCT/ISA/237) for International Application No. PCT/JP2019/028364, dated Jan. 26, 2021.
Extended European Search Report for European Application No. 19837075.1, dated Mar. 1, 2022.

* cited by examiner

*Primary Examiner* — Daniel S Gatewood
(74) *Attorney, Agent, or Firm* — Birch, Stewart, Kolasch & Birch, LLP

(57) ABSTRACT

Provided is a slurry for forming an electrode-active-material layer, the slurry improving adhesion to a current collector while suppressing a decrease in cell capacity. The present invention provides a slurry for forming an electrode-active-material layer for a cell, the slurry including at least an active material and an aqueous binder, wherein the slurry has an aqueous binder content from 0.1 to 0.8 parts by weight based on 100 parts by weight of the active material, and a supernatant obtained by centrifuging the slurry has the aqueous binder content of 45% by weight or greater of a total amount of the aqueous binder contained in the slurry. The slurry of the present invention preferably further contains a fibrous material.

12 Claims, No Drawings

SLURRY FOR FORMING ELECTRODE-ACTIVE-MATERIAL LAYER FOR CELL

TECHNICAL FIELD

The present invention relates to a slurry for forming an electrode-active-material layer for a cell, an electrode including a laminate of an electrode-active-material layer and a current collector, the electrode-active-material layer being formed using the slurry, and a cell provided with the electrode. The present application claims priority to the Japanese Patent Application No. 2018-137148 filed in Japan on Jul. 20, 2018, the content of which is incorporated herein.

BACKGROUND ART

In recent years, it has been examined to mount electricity storage devices such as lithium-ion secondary cells in hybrid vehicles and electric vehicles in addition to information-related devices such as smartphones and notebook computers. Therefore, such electricity storage devices are required to have a smaller size, a higher capacity, and a longer life.

In addition, there is a problem that, due to increase in density of a nonaqueous secondary cell and expansion and contraction of an electrode caused by repeated charging and discharging, an electrode-active-material layer peels off a current collector and thus that cell capacity decreases. Thus, a higher adhesion between the electrode-active-material layer and the current collector is required.

Typically, in an electrode, a slurry obtained by kneading an active material, a binder, and a solvent is applied to a current collector, and the slurry on the current collector is then dried and solidified to form an electrode-active-material layer. Thus, the active material is bound to the current collector. It is known to use styrene-butadiene rubber (SBR) or carboxymethyl cellulose (CMC) as the binder (Patent Document 1).

The active material and the current collector are bonded only by an adhesive force of the binder such as CMC. It was necessary to increase the amount of the binder in order to prevent the electrode-active-material layer from peeling off the current collector. However, it was problematic that a content proportion of the active material reduces along with the increase in binder amount and thus that the cell capacity decreases.

CITATION LIST

Patent Document

Patent Document 1: JP 2009-43641 A

SUMMARY OF INVENTION

Technical Problem

Therefore, an object of the present invention is to provide a slurry for forming an electrode-active-material layer, which improves adhesion to a current collector while suppressing a decrease in cell capacity.

Another object of the present invention is to provide a slurry for forming an electrode-active-material layer, which increases cell capacity and improves adhesion to a current collector.

Still another object of the present invention is to provide an electrode having a large cell capacity and excellent adhesion between an electrode-active-material layer and a current collector.

Yet another object of the present invention is to provide a cell provided with the electrode.

Solution to Problem

As a result of diligent research to solve the problems described above, the present inventor has found the following facts. Usually, in the slurry, the binder is selectively attached to a surface of the active material, and an excess amount of binder is present in a free state, which binder contained in the free state exhibits adhesion. By suppressing the attachment of the binder to the surface of the active material, the amount of the binder present in the free state can be increased without increasing a total amount of the binder contained in the slurry, so that the adhesion can be improved. The present invention was completed based on these findings.

That is, the present invention provides a slurry for forming an electrode-active-material layer for a cell, the slurry including at least an active material and an aqueous binder, wherein the slurry has an aqueous binder content from 0.1 to 0.8 parts by weight based on 100 parts by weight of the active material, and a supernatant obtained by centrifuging the slurry has the aqueous binder content of 45% by weight or greater of a total amount of the aqueous binder contained in the slurry.

The present invention also provides the slurry wherein a proportion of the active material in a total amount of nonvolatile matter contained in the slurry is 95% by weight or greater.

The present invention also provides the slurry wherein the aqueous binder is at least one selected from a polysaccharide derivative (1), a compound having a constituent unit represented by Formula (2) below, and a compound having a constituent unit represented by Formula (3) below:

[Chem. 1]

(2)

where R represents a hydroxyl group, a carboxyl group, a phenyl group, an N-substituted or unsubstituted carbamoyl group, or a 2-oxo-1-pyrrolidinyl group;

[Chem. 2]

(3)

where n represents an integer of 2 or greater and L represents an ether bond or (—NH—) group.

The present invention also provides the slurry further containing a fibrous material.

The present invention also provides the slurry wherein the fibrous material is a cellulose fiber.

The present invention also provides the slurry having an average thickness from 30 to 1000 nm and an average aspect ratio from 10 to 1000.

The present invention also provides a solidified product of the slurry.

The present invention also provides an electrode including a laminate of an electrode-active-material layer and a current collector, the electrode-active-material layer including the solidified product.

The present invention also provides the electrode wherein a peel strength between the electrode-active-material layer and the current collector is 2.0 N/m or greater.

The present invention also provides a cell provided with the electrode.

Advantageous Effects of Invention

The slurry according to an embodiment of the present invention contains 45% by weight or greater of the binder in a free state (i.e., a state of exhibiting adhesion). Therefore, an electrode-active-material layer that is firmly adhered to the current collector can be formed, and the active material can be firmly bound to the current collector. Furthermore, because 45% by weight or greater of the binder is contained in the free state as described above, excellent adhesion can be exhibited even without increasing the binder content or even when the binder content is reduced as compared with the typical content. Therefore, when the slurry according to an embodiment of the present invention is used, it is possible to improve adhesion without reducing the content proportion of the active material or increasing the content proportion of the active material as compared with the typical content proportion, and to form an electrode having excellent adhesion and high cell capacity in combination.

The electrode obtained using the slurry according to an embodiment of the present invention has a large cell capacity and has excellent adhesion between the electrode-active-material layer and the current collector. Thus, a cell provided with the electrode has excellent cell characteristics and can be suitably used for information-related devices such as smartphones and notebook computers, hybrid vehicles, electric vehicles, and the like.

DESCRIPTION OF EMBODIMENTS

Slurry

The slurry according to an embodiment of the present invention is a slurry including at least an active material and an aqueous binder, wherein the slurry has an aqueous binder content from 0.1 to 0.8 parts by weight based on 100 parts by weight of the active material, and a supernatant obtained by centrifuging the slurry (for example, at 5000 rpm×5 minutes) has the aqueous binder content of 45% by weight or greater of a total amount of the aqueous binder contained in the slurry. The slurry according to an embodiment of the present invention can be suitably used as a slurry for forming an electrode-active-material layer for a cell.

The proportion of the active material in a total amount (100% by weight) of nonvolatile matter contained in the slurry is, for example 95% by weight or greater, preferably 98% by weight or greater, particularly preferably 99% by weight or greater. Since the slurry according to an embodiment of the present invention has a high content proportion of the active material, the electrode obtained using the slurry according to an embodiment of the present invention has a high cell capacity.

The slurry according to an embodiment of the present invention may contain other components, in addition to the active material and the aqueous binder. Especially, the slurry according to an embodiment of the present invention preferably contains a fibrous material. The fibrous material is selectively attached to a surface of the active material than the binder in the slurry. Therefore, by adding a fibrous material to the slurry according to an embodiment of the present invention, it is possible to suppress the attachment of the binder to the surface of the active material, and to increase the amount of the binder present in the free form in the slurry. As a result, the adhesion between the electrode-active-material layer and the current collector can be improved even without increasing the amount of the binder or even if the amount of the binder is reduced as compared with the typical amount, and it is possible to improve the adhesion between the electrode-active-material layer and the current collector while suppressing a decrease in cell capacity or further improving the cell capacity.

Active Material

Examples of the active material include carbon materials (carbon), simple metals, simple silicon (silicon), silicon compounds, mineral substances (zeolite, diatomaceous earth, pyrogenic earth, talc, kaolin, sericite, bentonite, smectite, clay, etc.), metal carbonates (magnesium carbonate, heavy calcium carbonate, light calcium carbonate, etc.), metal oxides (alumina, zinc oxide, manganese dioxide, titanium dioxide, lead dioxide, silver oxide, nickel oxide, and lithium-containing complex oxide (e.g., $LiCoO_2$)), metal hydroxides (aluminum hydroxide, calcium hydroxide, magnesium hydroxide, nickel hydroxide, cadmium hydroxide, etc.), and metal sulfates (calcium sulfate, barium sulfate, etc.). One of these materials may be used alone, or two or more thereof can be used in combination. Among these materials, at least one selected from metal oxides, simple silicon, silicon compounds, and carbon materials is preferred as the active material.

The active material is preferably selected and used depending on the type of the cell. For example, in lithium-ion cells, a metal oxide (particularly, lithium cobalt oxide, lithium nickel oxide, or lithium manganate) is preferred as a positive electrode active material, and at least one selected from simple silicon, silicon compounds, carbon materials (particularly, graphite), and metal oxides is preferred as a negative electrode active material.

Examples of the simple silicon include silicon such as amorphous silicon (amorphous silicon) and low crystalline silicon.

Examples of the silicon compounds include silicon oxide (such as silica), metal silicates (calcium silicate, aluminum silicate, magnesium silicate, magnesium aluminosilicate, etc.), alloys of silicon and transition metals (tin, titanium, etc.), silicon composites (such as a composite of silicon and silicon monoxide), and silicon carbide.

Examples of the carbon materials include natural graphite, artificial graphite, amorphous carbon, graphite, mesocarbon microbeads, and pitch-based carbon fibers.

Aqueous Binder

The aqueous binder in the present invention is a compound that exhibits adhesiveness and has the effect of fixing the active material to a surface of the current collector. Note that the aqueous binder herein is a binder having a solubility in water at 20° C. of 1 g/L or higher, or a binder dispersed in water at 20° C. with a particle size of 1 µm or less (particle diameter measurement method: laser diffraction method).

The aqueous binder preferably has excellent heat resistance, and a binder having a melting point (decomposition temperature, when the melting point is absent) of, for example, 160° C. or higher (preferably 180° C. or higher, particularly preferably 200° C. or higher) is preferred. Note that the upper limit of the melting point of the aqueous binder (the decomposition temperature, when the melting point is absent) is, for example, 400° C.

As the aqueous binder, a 1% by weight aqueous solution has a viscosity (at 25° C. and 60 rotations) of preferably from 100 to 5000 mPa·s, particularly preferably from 500 to 3000 mPa·s, most preferably from 1000 to 2000 mPa·s.

Examples of the aqueous binder include a polysaccharide derivative (1), a compound having a constituent unit represented by Formula (2) below, and a compound having a constituent unit represented by Formula (3) below. One of these solvents can be used alone or two or more in combination.

[Chem. 3]

(2)

where R represents a hydroxyl group, a carboxyl group, a phenyl group, an N-substituted or unsubstituted carbamoyl group, or a 2-oxo-1-pyrrolidinyl group;

[Chem. 4]

(3)

where n represents an integer of 2 or greater and L represents an ether bond or (—NH—) group.

Examples of the N-substituted carbamoyl group include N—$C_{1-4}$ alkyl-substituted carbamoyl groups such as —CONHCH($CH_3$)$_2$ and —CON($CH_3$)$_2$ groups.

The carboxyl group may form a salt with an alkali metal.

n described above is an integer of 2 or greater and, for example, an integer of 2 to 5, preferably an integer of 2 or 3. Therefore, the [$C_nH_{2n}$] group in Formula (3) is an alkylene group with 2 or more carbon atoms, and examples thereof include dimethylene groups, methylmethylene groups, dimethylmethylene groups, and trimethylene groups.

The compound having a constituent unit represented by Formula (2) above and the compound having a constituent unit represented by Formula (3) above may have a constituent unit other than the constituent unit represented by Formula (2) and the constituent unit represented by Formula (3), respectively.

Examples of the compound having a constituent unit represented by Formula (2) include diene rubbers such as styrene-butadiene rubber (SBR), acrylonitrile-butadiene rubber (NBR), methacrylic acid-butadiene rubber (MBR), and butadiene rubber (Br); acrylic polymers such as polyacrylic acid, sodium polyacrylate, acrylic acid/maleic acid copolymer•sodium salt, and acrylic acid/sulfonic acid copolymer•sodium salt; acrylamide polymers such as polyacrylamide, poly-N-isopropyl acrylamide, and poly-N,N-dimethylacrylamide; and polyvinylpyrrolidone.

Examples of the compound having a constituent unit represented by Formula (3) include polyalkylene glycols such as polyethylene glycol and polypropylene glycol; and polyethyleneimine.

The polysaccharide derivative (1) is a compound in which two or more monosaccharides are polymerized by glycosidic bonds. In the present invention, especially, a compound formed by polymerizing glucose (for example, α-glucose or β-glucose) by glycosidic linkages, or a derivative thereof is preferred, and, in particular, at least one selected from cellulose, starch, glycogen, and derivative thereof is particularly preferred.

The polysaccharide derivative (1) is particularly preferably cellulose or a derivative thereof, in that it has excellent heat resistance and, when just added in a small amount, can impart excellent adhesive strength and viscosity to the slurry.

Examples of the cellulose or derivative thereof include compounds having a constituent unit represented by Formula (1-1) below:

[Chem. 5]

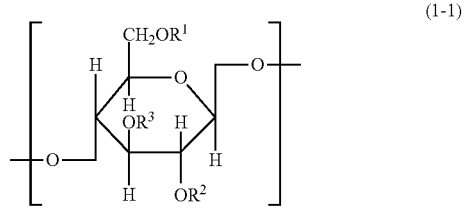

(1-1)

wherein, $R^1$ to $R^3$ are the same or different and represent hydrogen atoms, or alkyl groups with from 1 to 5 carbon atoms having a hydroxyl group or carboxyl group. Note that the hydroxyl group and carboxyl group may form a salt with an alkali metal.

Examples of the alkyl group with from 1 to 5 carbon atoms include a methyl group, an ethyl group, a propyl group, an isopropyl group, a butyl group, an isobutyl group, an s-butyl group, a t-butyl group, and a pentyl group.

The hydroxyl group and carboxyl group may form a salt with an alkali metal. For example, the hydroxyl group (—OH group) may form a salt with sodium to form an —ONa group, and the carboxyl group (—COOH group) may form a salt with sodium to form a —COONa group.

Specific examples of the derivative of the cellulose include hydroxyethyl cellulose, hydroxypropyl cellulose, carboxymethyl cellulose, and alkali metal salts thereof (for example, sodium carboxymethylcellulose).

The aqueous binder in the present invention is preferably a polysaccharide derivative (1), particularly preferably cellulose or a derivative thereof, because it has an excellent viscosity imparting effect, and, when just added in a small amount, can exhibit the effect of fixing the active material to a surface of the current collector, and because it has excellent heat resistance.

Fibrous Material

The fibrous material in the present invention is not dissolved in the slurry and can retain a fibrous shape. The fibrous material described above has a property of being selectively attached to the surface of the active material than the binder in the slurry. Therefore, the addition of a fibrous material to the slurry according to an embodiment of the present invention makes it possible to prevent the binder from covering the surface of the active material to increase the amount of the binder present free in the slurry, to improve the adhesion between the electrode-active-material layer and the current collector even without increasing the amount of the binder or even if the amount of the binder is reduced as compared with the typical amount, and to improve the adhesion between the electrode-active-material layer and the current collector while suppressing a decrease in cell capacity or further improving the cell capacity.

The slurry according to an embodiment of the present invention can contain one of fibrous materials alone, or two or more thereof in combination.

Examples of the fibrous material include cellulose fibers, aramid fibers, polyphenylene sulfide fibers, polyimide fibers, fluorine fibers, glass fibers, carbon fibers, poly-p-dioxanone fibers, polyether ether ketone fibers, and liquid crystal polymer fibers.

Furthermore, the fibrous material may have electrical conductivity, and examples of materials constituting the fibrous material having electrical conductivity include metals, semiconductors, carbon materials, and electrically conductive polymers.

Examples of the metal include known or customary metals such as gold, silver, copper, iron, nickel, cobalt, tin, and alloys thereof.

Examples of the semiconductor include known or customary semiconductors such as cadmium sulfide and cadmium selenide.

Examples of the carbon material include known or customary carbon materials such as carbon fibers and carbon nanotubes.

Examples of the electrically conductive polymer include polyacetylene, polyene, poly p-phenylene, poly p-phenylene, polypyrrole, polyaniline, polythiophene, and derivatives thereof (e.g. those having a common polymer backbone with a substituent such as an alkyl group, a hydroxyl group, a carboxyl group, an ethylenedioxy group, or the like; and specific examples thereof include polyethylenedioxythiophene).

An average thickness of the fibrous material is not particularly limited, but is, for example, from 30 to 1000 nm. Especially, the average thickness of the fibrous material is preferably from 40 to 500 nm, particularly preferably from 50 to 200 nm, from the viewpoint that the amount of the binder covering the surface of the active material can further be suppressed, and that the decrease in cell capacity can further be suppressed. Note that the average thickness of the fibrous material is determined by taking an electron microscopic image of a sufficient number (for example, 100 or greater) of fibrous materials using an electron microscope (SEM or TEM), measuring the thicknesses (diameters) of these fibrous materials, and arithmetically averaging them.

An average length of the fibrous material is not particularly limited, but is, for example, from 0.1 to 1000 μm. Especially, the average thickness of the fibrous material is preferably from 1 to 200 μm, particularly preferably from 1.5 to 100 μm, most preferably from 2 to 20 μm from the viewpoint that the amount of the binder covering the surface of the active material can further be suppressed, and that the decrease in cell capacity can further be suppressed. Note that the average length of the fibrous material is determined by taking an electron microscopic image of a sufficient number (for example, 100 or greater) of fibrous materials using an electron microscope (SEM or TEM), measuring the lengths of these fibrous materials, and arithmetically averaging them. The length of the fibrous material should be measured in a straight state, but the fibrous material is actually bent in many cases. So, a projected diameter and a projected area of the fibrous material are calculated using an image analyzer from the electron microscopic image, and, assuming that the fibrous material is a cylindrical body, the length of the fibrous material is calculated from the following formula.

Length=projected area/projected diameter

An average aspect ratio of the fibrous material is not particularly limited, but is, for example, from 10 to 1000. Especially, the average aspect ratio of the fibrous material is preferably from 15 to 500, particularly preferably from 20 to 100, from the viewpoint that the amount of the binder covering the surface of the active material can further be suppressed, and that the decrease in cell capacity can further be suppressed.

Especially, the fibrous material is preferably a material that is less likely to be deteriorated due to an oxidation-reduction reaction of the cell, because it has excellent stability over time. In particular, the fibrous material is preferably at least one selected from cellulose fibers, aramid fibers, or carbon fibers and carbon nanotubes, and is particularly preferably cellulose fibers and/or aramid fibers because it is particularly excellent in affinity with the active material and selectively attached to the surface of the active material.

Cellulose Fiber

The cellulose fibers can be manufactured by a known method such as milling, grinding, shredding, or crushing of raw material pulp. In addition, cotton linter and wood pulp (hardwood pulp and softwood pulp) can be used as the raw material pulp.

Commercially available products such as microfibrous cellulose "CELISH" (manufactured by Daicel FineChem Ltd.) may be used as the cellulose fiber.

Aramid Fiber

The aramid fiber is a fiber including a polymer (i.e., a wholly aromatic polyamide) having a structure in which two or more aromatic rings are bonded via an amide bond, and the wholly aromatic polyamide includes a meta type and a para type. Examples of the wholly aromatic polyamide include polymers having a constituent unit represented by Formula (a) below:

[Chem. 6]

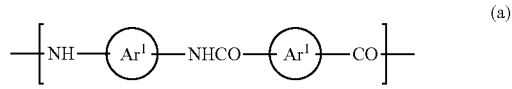

(a)

where $Ar^1$ and $Ar^2$ are the same or different and represent an aromatic rings or groups in which two or more aromatic rings are bonded via a single bond or a linking group. Examples of the aromatic ring include aromatic hydrocarbon rings with from 6 to 10 carbon atoms, such as a benzene ring or a naphthalene ring. Examples of the linking group include divalent hydrocarbon groups (e.g., linear or branched alkylene groups with from 1 to 18 carbon atoms, and divalent alicyclic hydrocarbon groups with from 3 to 18 carbons), carbonyl groups (—CO—), ether bonds (—O—), ester bonds (—COO—), —NH— and —SO$_2$—. The aromatic ring can also have various substituents [such as halogen atoms, alkyl groups (e.g., $C_{1-4}$ alkyl groups), oxo groups, hydroxyl groups, substituted oxy groups (e.g., $C_{1-4}$ alkoxy groups and $C_{1-4}$ acyloxy groups); carboxyl groups, substituted oxycarbonyl groups (e.g., $C_{1-4}$ alkoxycarbonyl groups), cyano groups, nitro groups, substituted or unsubstituted amino groups (e.g., mono- or di-$C_{1-4}$ alkylamino groups), and sulfo groups]. In addition, an aromatic or non-aromatic heterocyclic ring may be fused to the aromatic ring.

The aramid fiber can be manufactured, for example, by reacting at least one of aromatic diamine to a halide of at least one of aromatic dicarboxylic acid (solution polymerization, interfacial polymerization, or the like).

Examples of the aromatic dicarboxylic acid include isophthalic acid, terephthalic acid 1,4-naphthalene dicarboxylic acid, 2,6-naphthalene dicarboxylic acid, 4,4'-biphenyl dicarboxylic acid, 3,3'-biphenyldicarboxylic acid, and 4,4'-diphenyletherdicarboxylic acid.

Examples of the aromatic diamine include p-phenylene diamine, m-phenylene diamine, 4,4'-diaminobiphenyl, 2,4-diaminodiphenylamine, 4,4'-diaminobenzophenone, 4,4'-diaminodiphenyl ether, 4,4'-diaminodiphenylmethane, 4,4'-diaminodiphenylamine, 4,4'-diaminodiphenylsulfone, 2,4-diaminotoluene, 2,6-naphthalenediamine, and 1,5-naphthalenediamine.

The aramid fiber can be manufactured by spinning the wholly aromatic polyamide into fibers using known customary methods (e.g., via spinning, washing, drying, and other processes). Furthermore, after the wholly aromatic polyamide is spun into fibers, the fibers can be, for example, shred as necessary. For example, an ultrahigh-pressure homogenizer or the like can be used to add strong mechanical shear force for microfibrillation.

Commercially available products such as a fibrous material aramid "TIARA" (manufactured by Daicel FineChem Ltd.) may be used as the aramid fiber.

<Additional Component>

The slurry according to an embodiment of the present invention may further contain one or more other components in addition to the components described above. Examples of the other components include solvents and conductive imparting materials.

Examples of the solvent include water; alcohols such as methanol, ethanol, propanol, and 2-propanol; cyclic ethers such as tetrahydrofuran and 1,4-dioxane; chain amides such as N,N-dimethylformamide and N,N-dimethylacetamide; cyclic amides such as N-methylpyrrolidone and N-ethylpyrrolidone; and sulfoxides such as methyl sulfoxide. Among these solvents, water is preferably used from the perspective of having small environmental load and excellent safety.

Examples of the electrical conductivity imparting material include metal powder, conductive polymers, and acetylene black.

A viscosity (rotational viscometer, at 25° C. and 30 rotations) of the slurry according to an embodiment of the present invention is, for example, from 0.2 to 100 Pa·s (preferably from 0.3 to 50 Pa·s, particularly preferably from 0.5 to 10 Pa·s) from the viewpoint of providing excellent coatability. The viscosity of the slurry can be adjusted, for example, by adding the solvent.

The slurry according to an embodiment of the present invention can be manufactured by uniformly mixing the compounds described above using a generally known device for mixing, such as a rotation/revolution-type agitating and defoaming device, a homodisper, a homogenizer, a planetary mixer, a three-roll mill, or a bead mill. Here, each component may be mixed at the same time or sequentially.

The content of the aqueous binder in the slurry according to an embodiment of the present invention is from 0.1 to 0.8 parts by weight, preferably from 0.3 to 0.7 parts by weight, particularly preferably from 0.3 to 0.6 parts by weight, based on 100 parts by weight of the active material contained in the slurry. The slurry according to an embodiment of the present invention contains the aqueous binder within the range described above, and thus can improve adhesion to the current collector while suppressing a decrease in cell capacity. When the content of the aqueous binder exceeds the range described above, there is a tendency that the adhesion to the current collector increases, but that the cell capacity decreases. On the other hand, when the content of the aqueous binder falls below the range described above, there is a tendency that the adhesion to the current collector is insufficient, that the electrode-active-material layer peels off the current collector, and thus that the cell capacity decreases.

The content of the aqueous binder in the total amount of the nonvolatile matter contained in the slurry according to an embodiment of the present invention is, for example, from 0.1 to 0.8 parts by weight, preferably from 0.3 to 0.7 parts by weight, particularly preferably from 0.3 to 0.6 parts by weight.

When the slurry according to an embodiment of the present invention contains a fibrous material, the content of the fibrous material in the total amount of the nonvolatile matter contained in the slurry is, for example, from 0.1 to 5.0% by weight, preferably from 0.3 to 3.0% by weight, particularly preferably from 0.5 to 1.5% by weight.

When the slurry according to an embodiment of the present invention contains a fibrous material, the total content of the fibrous material and the aqueous binder in the total amount of the nonvolatile matter contained in the slurry is, for example, from 0.2 to 2.0% by weight, preferably from 0.5 to 1.5% by weight, particularly preferably from 0.5 to 1.0% by weight, most preferably from 0.5 to 0.8% by weight.

When the slurry according to an embodiment of the present invention contains a fibrous material, the content of the fibrous material is preferably approximately from 0.5 to 5.0 times by weight, particularly preferably from 1.0 to 3.0 times by weight, most preferably from 1.0 to 2.0 times by weight, most preferably from 1.0 to 1.5 times by weight, the aqueous binder content.

The content of the aqueous binder in a supernatant obtained by centrifuging the slurry according to an embodiment of the present invention (which corresponds to the amount of the aqueous binder contained in the slurry in a free state without covering the surface of the active material) is 45% by weight or greater, preferably 60% by weight or greater, particularly preferably 80% by weight or greater, most preferably 90% by weight, especially preferably 95% by weight or greater, of the total amount of the aqueous binder contained in the slurry.

The slurry according to an embodiment of the present invention contains most of the aqueous binder in the free state as described above, and thus, when applied to the current collector and dried, can form a solidified product that is firmly adhered to the current collector. When the content proportion of the free-state aqueous binder falls below the range described above, it is necessary to increase the amount of the aqueous binder in the slurry for the purpose of improving adhesion, thereby making it difficult to form an electrode having both excellent adhesion and high cell capacity.

The content of the aqueous binder contained in the free state in the slurry according to an embodiment of the present invention is from 0.1 to 0.8 parts by weight, preferably from 0.3 to 0.7 parts by weight, particularly preferably from 0.3 to 0.6 parts by weight, based on 100 parts by weight of the active material contained in the slurry. Therefore, when applied to the current collector and dried, the slurry can form a solidified product that is firmly adhered to the current collector. When the amount of the free-state aqueous binder falls below the range described above, there is a tendency that the adhesion to the current collector is insufficient, that the electrode-active-material layer peels off the current collector, and thus that the cell capacity decreases.

The slurry according to an embodiment of the present invention can be suitably used for forming an electrode-active-material layer for a cell. When the slurry according to an embodiment of the present invention is used, it is possible to form an electrode having both excellent adhesion and high cell capacity.

Electrode

The electrode according to an embodiment of present invention includes a laminate of an electrode-active-material layer and a current collector, the electrode-active-material layer including the solidified product of the slurry described above. The electrode according to an embodiment of the present invention may contain components other than the solidified product of the slurry and the current collector.

The electrode according to an embodiment of the present invention can be manufactured by, for example, applying the slurry to at least one surface of the current collector and drying the slurry to solidify the slurry.

The current collector includes a positive electrode current collector and a negative electrode current collector, and the positive electrode current collector is formed of, for example, an aluminum foil. In addition, the negative electrode current collector is formed of, for example, a copper foil.

The amount of the slurry to be applied is, for example, approximately from 20 to 350 g/m$^2$, and the thickness of the slurry to be applied is preferably approximately 5 to 500 μm, for example, after drying. Examples of the method of applying the slurry include screen printing methods, mask printing methods, offset printing methods, inkjet printing methods, flexographic printing methods, gravure printing methods, stamping, dispensing, squeegee printing methods, silk screen printing methods, spraying and brushing. Furthermore, a film applicator, a bar coater, a die coater, a comma coater, a gravure coater, a blade coater, and the like can be used for applying the slurry.

The method of drying the applied slurry is not particularly limited, and examples thereof include drying methods through heating, pressure reduction, blowing, and the like. The heating temperature and time, the degree and time of pressure reduction, the amount of gas to be blown, the blowing rate, the blowing temperature, the type of gas to be blown, the degree of drying, the area to be blown, the direction of the gas to be blown, and the like can be selected arbitrarily.

The electrode of the present invention has particularly excellent adhesion between the electrode-active-material layer including the solidified product of the slurry described above and the current collector, and has a peel strength of, for example, 2.0 N/m or greater, preferably 3.0 N/m or greater, particularly preferably 3.5 N/m or greater. The upper limit of the peel strength is, for example, 10.0 N/m, preferably 8.0 N/m. Therefore, even when the electrode expands and contracts due to repeated charging and discharging, the electrode-active-material layer can be prevented from peeling off the current collector, and the cell capacity can be stably maintained over a long period of time.

In addition, the electrode according to an embodiment of the present invention is provided with an electrode-active-material layer including the solidified product of the slurry described above, and the slurry has a high content proportion of the active material. Therefore, the electrode according to an embodiment of the present invention has a high cell capacity.

Cell

The cell according to an embodiment of the present invention is provided with the electrode described above. The cell of the present invention may be a wound cell formed by laminating electrodes (positive electrode and a negative electrode) and a separator, winding the laminate, and enclosing the laminate in a container such as a can together with an electrolyte solution, or a laminated cell in which a sheet-shaped product formed by laminating electrodes (positive electrode and a negative electrode) and a separator is encapsulated in a relatively flexible sheath body together with an electrolyte solution.

Examples of the cell according to an embodiment of the present invention include secondary cells such as lithium ion cells, nickel/hydrogen rechargeable cells, and nickel/cadmium cells; primary cells such as manganese dry cells, alkaline manganese cells, and lithium primary cells; and electric double-layer capacitors.

Even when the cell according to an embodiment of the present invention is repeatedly charged and discharged, it is possible to prevent the electrode-active-material layer from peeling off the current collector, and to stably maintain a high cell capacity over a long period of time. Therefore, the cell according to an embodiment of the present invention can suitably be used in information-related devices such as smartphones and notebook computers, hybrid vehicles, electric vehicles, and the like.

EXAMPLES

Hereinafter, the present invention will be described more specifically with reference to examples, but the present invention is not limited by these examples.

Preparation Example 1 (Preparation of Cellulose Nanofiber (CNF) Slurry)

Commercially available hardwood pulp was suspended in water, and 100 L of 1% by weight slurry solution was obtained.

Next, the obtained slurry solution was beaten ten times to be refined, with a clearance of 0.15 mm and at a disk rotation speed of 1750 rpm, using a disc refiner (trade name "SUPERFIBRATER400-TFS" available from Hasegawa Refrigeration, Ltd.).

The 1% by weight slurry solution after the refiner treatment was further homogenized 50 times, at a processing pressure of 50 MPa, using a homogenizer (available from Gaulin Corporation, trade name "15M8AT").

The 1% by weight slurry solution after the refiner treatment and the homogenization treatment was repeatedly filtered through gauze to yield a slurry solution having a nonvolatile matter concentration of 9.9% by weight.

Water was added to the obtained 9.9% by weight slurry solution, and the mixture was stirred using a homodisper (available from Tokushu Kika Kogyo Co., Ltd., Model L) for 5 minutes at 3000 rpm to yield 0.8% by weight of a slurry solution. The obtained 0.8% by weight slurry solution is used as a CNF slurry solution (1).

Ten fibers contained in the obtained CNF slurry solution (1) were optionally selected, and the lengths and diameters of the selected fibers were measured by observing the fibers using a transmission electron microscope (TEM). As a result, an average thickness of the 10 fibers was 79.2 nm, an average length thereof was 6.14 μm, and an average aspect ratio (average length/average thickness) thereof was 78.

Example 1

125 g of the CNF slurry solution (1) obtained in Preparation Example 1 was charged in a polypropylene container and 26.7 g of a 1.5% by weight aqueous CMC solution (CMC: carboxymethylcellulose sodium salt; viscosity of its 1% by weight aqueous solution at 25° C. and 60 rotations: 1500 to 3000 mPa·s; available from Daicel FineChem Ltd., Product No. 2200) was added. The solution mixture was stirred for 1 minute at 3000 rpm using a homodisper (manufactured by Tokushu Kika Kogyo Co., Ltd., Model L).

Thereafter, 98.6 g of artificial graphite (average particle size: approximately 20 μm) as an active material was added. After the mixture was stirred for another 30 minutes, a slurry (1) was obtained.

The viscosity of the obtained slurry (1), when measured at 25° C. and 30 rotations using a rotational viscometer, was 9.5 Pa s.

The obtained slurry (1) was applied to a copper foil with a thickness of 10 μm using an applicator for the purpose of attaining a thickness after drying of 120 μm. Then, the applied slurry (1) was dried to be solidified, thereby producing an electrode.

Examples of 2 to 3 and Comparative Examples 1 to 3

A slurry was obtained in the same manner as in Example 1 with the exception that the formulation was changed as indicated in the table below, and the obtained slurry was used to produce an electrode.

Measurement of Amount of Free CMC

A supernatant was fractionated by centrifuging (5000 rpm×5 minutes) each of the slurries obtained in the Examples and Comparative Examples using a centrifugal separator (Table Top Centrifugal Machine 4200, available from KUBOTA Manufacturing Corporation), and the viscosity of the supernatant was measured. The CMC concentration was determined from the calibration curve created in advance, and used as the amount of CMC contained in a free state.

Adherence

The peel strength between the copper foil and the solidified product in each of the electrodes obtained in the Examples and Comparative Examples was measured by 90° peeling test (method according to JIS K6854-1).

Specifically, the electrode (solidified product/copper foil) was cut into a width of 25 mm and a length of 125 mm to form a test piece. The test piece was placed on an acrylic plate in a state where the solidified product surface side was in contact with the acrylic plate, and bonded and fixed to the acrylic plate using a double-sided tape.

An end of the copper foil of the test piece was held by the tensile tester, and the peel strength (N/m) was measured at a tension rate of 300 mm/min and a peel angle of 90°.

The results are summarized and shown in the table below.

To summarize the above, configurations and variations according to an embodiment of the present invention will be described below.

[1] A slurry including at least an active material and an aqueous binder, wherein the slurry has an aqueous binder content from 0.1 to 0.8 parts by weight based on 100 parts by weight of the active material, and a supernatant obtained by centrifuging the slurry has the aqueous binder content of 45% by weight or greater of a total amount of the aqueous binder contained in the slurry.

[2] The slurry according to [1], wherein a proportion of the active material in a total amount of nonvolatile matter contained in the slurry is 95% by weight or greater.

[3] The slurry according to [1] or [2], wherein the aqueous binder has a melting point or decomposition temperature of 160° C. or higher.

[4] The slurry according to any one of [1] to [3], wherein a 1% by weight aqueous solution of the aqueous binder has a viscosity at 25° C. and 60 rotations from 100 to 5000 mPa·s.

[5] The slurry according to any one of [1] to [4], wherein the aqueous binder is at least one selected from a polysaccharide derivative (1), a compound having a constituent unit represented by Formula (2), and a compound having a constituent unit represented by Formula (3).

[6] The slurry according to any one of [1] to [5], further including a fibrous material.

[7] The slurry according to [6], wherein the fibrous material is a cellulose fiber.

[8] The slurry according to [6] or [7], wherein the fibrous material has an average thickness from 30 to 1000 nm and an average aspect ratio from 10 to 1000.

[9] The slurry according to any one of [6] to [8], wherein a fibrous material content is 0.5 to 5.0 times by weight of the aqueous binder content.

[10] The slurry according to any one of [6] to [9], wherein the fibrous material content in the total amount of the nonvolatile matter contained in the slurry is from 0.1 to 1.5% by weight.

[11] The slurry according to any one of [6] to [10], wherein a total content of the fibrous material and the aqueous binder in the total amount of the nonvolatile matter contained in the slurry is from 0.2 to 2.0% by weight.

[12] The slurry according to any one of [1] to [11], which has a viscosity at 25° C. and 30 rotations from 0.2 to 100 Pa·s.

TABLE 1

| | Nonvolatile matter | | | Free CMC/ | Free CMC/ | Graphite/ nonvolatile | Peel strength |
|---|---|---|---|---|---|---|---|
| | Graphite | CMC | CNF | total CMC | graphite | matter | (N/m) |
| Example 1 | 98.6 | 0.4 | 1.0 | 95 | 0.39 | 98.6 | 4.0 |
| Example 2 | 99.0 | 0.5 | 0.5 | 81 | 0.42 | 99.0 | 3.7 |
| Example 3 | 98.4 | 0.6 | 1.0 | 97 | 0.59 | 98.4 | 5.7 |
| Comparative Example 1 | 98 | 1.0 | 1.0 | 99 | 1.01 | 98 | 10.9 |
| Comparative Example 2 | 99 | 1.0 | 0 | 39 | 0.04 | 99 | 1.8 |
| Comparative Example 3 | 98 | 2.0 | 0 | 42 | 0.86 | 98 | 7.4 |

[13] The slurry according to any one of [1] to [12], which is a slurry for forming an electrode-active-material layer for a cell.

[14] A method of producing a cell, including forming an electrode-active-material layer using the slurry described in any one of [1] to [13].

[15] A method of producing an electrode-active-material layer, including producing an electrode-active-material layer for a cell using the slurry described in any one of [1] to [13].

[16] A solidified product of the slurry described in any one of [1] to [13].

[17] An electrode including a laminate of an electrode-active-material layer and a current collector, the electrode-active-material layer including the solidified product described in [16].

[18] The electrode according to [17], wherein a peel strength between the electrode-active-material layer and the current collector is 2.0 N/m or greater.

[19] A cell provided with the electrode described in [17] or [18].

INDUSTRIAL APPLICABILITY

When the slurry according to an embodiment of the present invention is used, it is possible to form an electrode having both excellent adhesion and high cell capacity.

Furthermore, the electrode obtained using the slurry according to an embodiment of the present invention has a large cell capacity and has excellent adhesion between the electrode-active-material layer and the current collector. Thus, a cell provided with the electrode has excellent cell characteristics and can be suitably used for information-related devices such as smartphones and notebook computers, hybrid vehicles, electric vehicles, and the like.

The invention claimed is:

1. A slurry for forming an electrode-active-material layer for a cell, the slurry comprising at least:
   an active material;
   an aqueous binder; and
   a cellulose fiber;
   wherein the aqueous binder is a cellulose or a derivative thereof,
   wherein the slurry has a content of the cellulose or the derivative thereof from 0.1 to 0.6% by weight of a total amount of nonvolatile matter contained in the slurry;
   wherein the cellulose fiber has an average thickness from 30 to 1000 nm and an average aspect ratio of from 10 to 1000;
   wherein the cellulose fiber is present in a content of 1.5 to 3.0 times by weight of the aqueous binder content; and
   wherein a supernatant obtained by centrifuging the slurry has a content of the cellulose or the derivative thereof of 90% by weight or greater based on a total amount of the cellulose or the derivative thereof contained in the slurry.

2. The slurry according to claim 1, wherein the active material is present in a proportion of 95% by weight or greater of a total amount of nonvolatile matter contained in the slurry, wherein, when the slurry further comprises a solvent, the active material is present in a proportion of 95% by weight or greater of a total amount of all components in the slurry excluding the solvent.

3. A solidified product of the slurry described in claim 1.

4. An electrode comprising a laminate of an electrode-active-material layer and a current collector, the electrode-active-material layer including the solidified product described in claim 3.

5. The electrode according to claim 4, wherein a peel strength between the electrode-active-material layer and the current collector is 2.0 N/m or greater.

6. A cell comprising the electrode described in claim 4.

7. The slurry for forming an electrode-active-material layer for a cell according to claim 1, wherein the cellulose or a derivative thereof is a carboxymethyl cellulose or an alkali metal salt thereof.

8. The slurry for forming an electrode-active-material layer for a cell according to claim 1, wherein a 1% by weight aqueous solution of the aqueous binder has a viscosity at 25° C. and 60 rotations from 1000 to 5000 mPa·s.

9. The slurry for forming an electrode-active-material layer for a cell according to claim 1, wherein the slurry has a content of the cellulose or the derivative thereof from 0.1 to 0.4% by weight of a total amount of nonvolatile matter contained in the slurry.

10. The slurry for forming an electrode-active-material layer for a cell according to claim 1, wherein the slurry comprising at least:
    an active material;
    carboxymethyl cellulose or an alkali metal salt thereof; and
    a cellulose fiber;
    wherein the slurry has a content of the carboxymethyl cellulose or an alkali metal salt thereof from 0.1 to 0.6% by weight of a total amount of nonvolatile matter contained in the slurry;
    wherein the cellulose fiber has an average thickness from 30 to 1000 nm and an average aspect ratio of from 10 to 1000;
    wherein the cellulose fiber is present in a content of 1.5 to 3.0 times by weight of the content of the carboxymethyl cellulose or an alkali metal salt thereof; and
    wherein a supernatant obtained by centrifuging the slurry has a content of the carboxymethyl cellulose or an alkali metal salt thereof of 90% by weight or greater based on a total amount of the cellulose or the derivative thereof contained in the slurry.

11. The slurry for forming an electrode-active-material layer for a cell according to claim 10, wherein a 1% by weight aqueous solution of the carboxymethyl cellulose or an alkali metal salt thereof has a viscosity at 25° C. and 60 rotations from 1000 to 5000 mPa·s.

12. The slurry for forming an electrode-active-material layer for a cell according to claim 10, wherein the slurry has a content of the carboxymethyl cellulose or an alkali metal salt thereof from 0.1 to 0.4% by weight of a total amount of nonvolatile matter contained in the slurry.

* * * * *